United States Patent [19]

Habiger

[11] 4,072,167
[45] Feb. 7, 1978

[54] CHECK VALVE WITH TORSION SPRING AND METHOD OF ASSEMBLY

[75] Inventor: Cyril W. Habiger, Joliet, Ill.

[73] Assignee: Caterpillar Tractor Co., Peoria, Ill.

[21] Appl. No.: 633,350

[22] Filed: Nov. 19, 1975

[51] Int. Cl.² .............................................. F16K 15/04
[52] U.S. Cl. .................................. 137/535; 137/539; 251/337; 29/157.1 R
[58] Field of Search ............ 137/535, 537, 539, 539.5; 251/337; 29/157.1 R

[56] References Cited

U.S. PATENT DOCUMENTS

| | | | |
|---|---|---|---|
| 777,654 | 12/1904 | Hoon et al. | 137/539 |
| 918,534 | 4/1909 | Guilford | 251/337 X |
| 1,659,329 | 2/1928 | Neller | 137/539.5 X |
| 1,764,835 | 6/1930 | Geer | 251/337 |
| 1,922,379 | 8/1933 | Longfellow | 137/539 X |
| 2,114,482 | 4/1938 | Vrtel | 137/539 X |
| 2,981,515 | 4/1961 | Abrams et al. | 251/337 X |

*Primary Examiner*—William R. Cline
*Attorney, Agent, or Firm*—Phillips, Moore, Weissenberger, Lempio & Majestic

[57] ABSTRACT

A check valve comprises a housing having a ball normally disposed on a seat defined therein to prevent communication of fluid from an inlet to an outlet thereof. A torsion spring is mounted on the housing to have an end thereof engage the ball to hold it in its normally closed position and to permit opening thereof to communicate the inlet with the outlet when the level of fluid pressure in the inlet exceeds a predetermined level. In the preferred embodiment, the torsion spring is mounted on a rotary member rotatably mounted in the housing to selectively adjust the closing force applied to the ball to vary the pressure setting thereof. During assembly of the valve, a pin is secured to the housing in blocking relationship across an outlet passage to limit pivotal movement of the end of the spring and to prevent the ball from rolling therepast.

19 Claims, 4 Drawing Figures

CHECK VALVE WITH TORSION SPRING AND METHOD OF ASSEMBLY

BACKGROUND OF THE INVENTION

This invention relates to a check valve of the type employed in fluid circuits for relieving excess pressures occurring therein. Conventional check or relief valves normally comprise a valve member reciprocally mounted in a housing and normally biased onto a seat thereof by a compression coil spring. When system pressures exceed a predetermined level, the valve member will open to relieve such pressures. Means for selectively adjusting the closing force on such valve member are oftentimes employed, as exemplified by the valve adjustment means disclosed in U.S. Pat. No. 3,550,617, assigned to the assignee of this application.

SUMMARY OF THIS INVENTION

An object of this invention is to provide an improved, economical and non-complex valve, particularly adapted for relief valve applications. The valve comprises a housing having an inlet and an outlet defined therein and a valve member normally disposed on a seat for preventing fluid flow from the inlet to the outlet. A torsion spring is mounted on the housing and has an end thereof operatively engaged with the valve member for biasing it against the seat under a predetermined closing force and for permitting unseating thereof to communicate the inlet with the outlet when the force of fluid in the inlet exceeds the closing force applied to the valve member by the torsion spring. In the preferred embodiment of this invention, the torsion spring is mounted on a rotary member rotatably mounted in the housing to selectively adjust the closing force on the valve member.

BRIEF DESCRIPTION OF THE DRAWING

Other objects of this invention will become apparent from the following description and accompanying drawing wherein:

FIG. 2 is an end elevational view of the valve;

DETAILED DESCRIPTION

Figure 1:
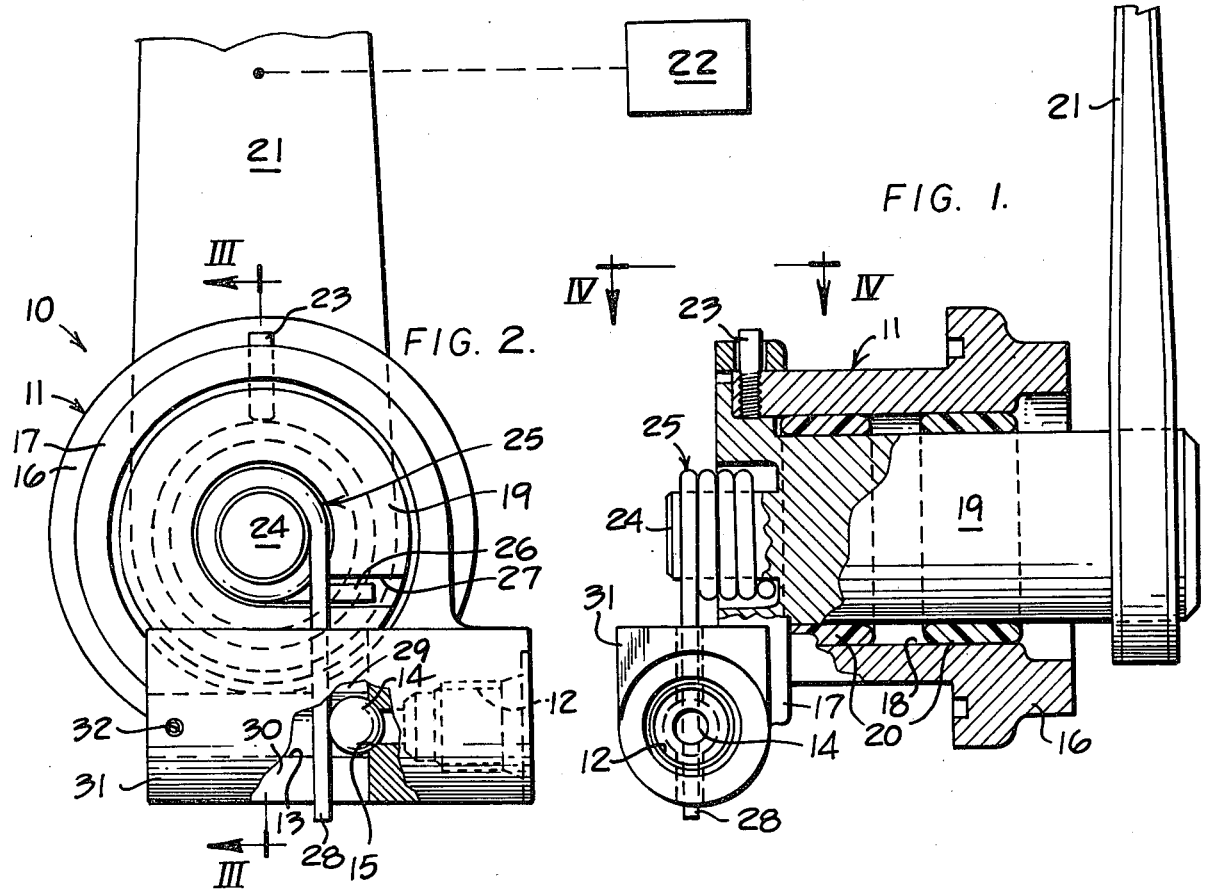
FIG. 1 is a partially sectioned side elevational view of a valve embodying this invention.
Figure 3:
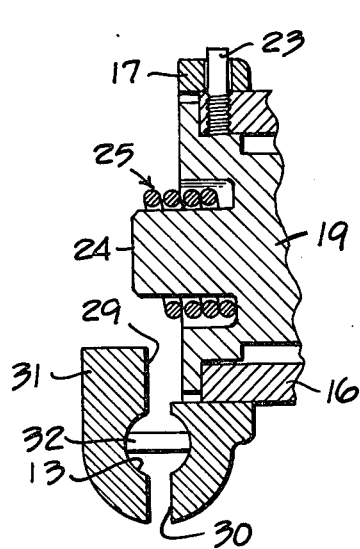
FIG. 3 is a sectional view, taken in the direction of arrows III—III in FIG. 2.
Figure 4:
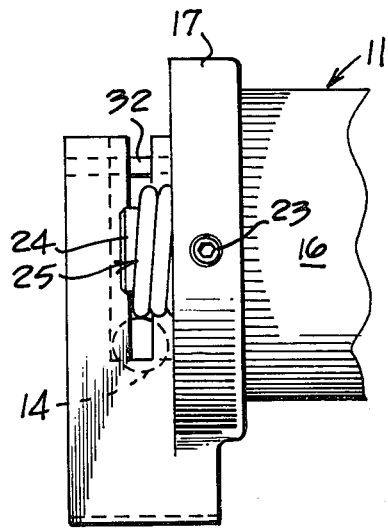
FIG. 4 is a partial top plan view taken in the direction of arrows IV—IV in FIG. 1.

The drawing illustrates a pressure relief valve 10 comprising a housing 11 having an inlet 12 and an outlet 13 defined therein. A valve member or ball check 14 is normally disposed on a spherically shaped seat 15 to prevent fluid flow from the inlet to the outlet. The housing may comprise a cylindrical main body portion 16 and an outer portion 17 suitably secured in transverse relationship on the outer end of the body portion and defining the inlet, outlet and seat therein.

Main body portion 16 of the housing defines a cylindrical bore 18 which rotatably mounts a cylindrical adjustment means or rotary member 19 therein. A pair of axially spaced annular bearing bushings 20 may be disposed between bore 18 and rotary member 19 to provide bearing means reducing the coefficient of friction therebetween upon selective rotation of the member. As illustrated in FIG. 2, a lever 21 may be secured to a first end of rotary member 19 to selectively rotate the same either manually or under the influence of a suitable remote control means 22 connected to the lever by a suitable linkage.

Holding means, comprising a set screw 23 projecting through an aperture formed through housing portion 17 and threadably mounted in main body portion 16 thereof, is provided for holding rotary member 19 in a selected rotated position. In particular, the inner end of the set screw will frictionally engage a cylindrical surface portion formed on a second end of the rotary member. The rotary member further comprises a longitudinally disposed boss 24 formed on the second end thereof to mount the coils of a torsion spring means 25 thereon.

As shown in FIG. 2, a first end 26 of the torsion spring means is disposed in a recess 27 formed in rotary member 19 to anchor the spring thereat. A second end 28 of the spring extends at right angles relative to end 26 thereof to abut a downstream side of ball check 14 to normally bias it into its closed position on seat 15. End 28 of the spring extends through accommodating slots 29 and 30 formed in an extension 31 of outer housing portion 17. A roll pin 32 is secured to extension 31 to intersect outlet passage 13 to function as a stop means for preventing ball check 14 from rolling therepast and to limit clockwise movement of end 28 of the torsion spring means (FIG. 2).

From the above description, it can be seen that end 28 of torsion spring means 25 is operatively engaged with ball check 14 to bias it against seat 15 under a predetermined closing force and for permitting unseating thereof to communicate inlet 12 with outlet 13 when the force of pressurized fluid in the inlet exceeds such predetermined closing force. Valve 10 could be suitably mounted in a reservoir, for example, to dump relieved fluid pressure therein directly. Lever 21 could be actuated manually, upon release of set screw 21, to reset the amount of force applied to ball check 14 by end 28 of the torsion spring means. Alternatively, automatic and remote control means 22, preferably sensitive to other system pressures, may be utilized in lieu or in addition to set screw 21 to regulate the closing force applied to the ball check.

The method for assembly of the check valve may include the following steps: placing ball 14 in outlet passage 13; mounting spring 25 on boss 24 of member 19 to anchor leg 26 in recess 27; rotatably mounting member 19 in housing 11 with the member rotated clockwise from its FIG. 2 position to dispose end 28 of the spring above extension 31 of the housing; attaching handle 21 to member 19; rotating the handle and member 19 counterclockwise in FIG. 2 to engage end 28 of the spring with ball 14 to impose a predetermined closing force thereon; screwing-down set screw 21 to fix member 19 in its selected rotative position relative to the housing; and securing pin 32 in place on the housing, adjacent to end 28 of the spring, to limit clockwise movement of such end in FIG. 2.

I claim:

1. In a valve of the type comprising a housing having an inlet and an outlet defined therein, a seat defined in said housing between said inlet and said outlet, and a valve member normally disposed on said seat for preventing fluid flow from said inlet to said outlet, the invention comprising torsion spring means having a first end thereof operatively engaging said valve member for biasing the same against said seat under a predetermined closing force and for permitting unseating thereof from said seat to permit said inlet to communicate with said outlet when the force of said fluid in said inlet exceeds said predetermined closing force and adjusting means connected to said torsion spring means and otherwise independent thereof for selectively varying the closing force of said torsion spring means against said valve member comprising a rotary member rotatably mounted in said housing and wherein said torsion spring means has a second end thereof disposed and anchored in a recess formed in said rotary member and wherein coils thereof are mounted on a boss formed on an end of said rotary member.

2. The valve of claim 1 further comprising holding means for selectively holding said rotary member in a selected rotated position relative to said housing.

3. The valve of claim 2 wherein said holding means comprises a set screw threadably mounted in said housing and normally engaging an outer surface of said rotary member to hold it in said selected rotational position.

4. The valve of claim 1 wherein said adjustment means comprises a lever secured to said rotary member for selectively rotating the same.

5. The valve of claim 4 further comprising remote control means operatively connected to said lever for selectively moving the same to rotate said member.

6. The valve of claim 1 wherein bearing means rotatably mount said rotary member in said housing.

7. The valve of claim 6 wherein said bearing means comprises a pair of axially spaced and annular bearing bushings mounted between a cylindrical bore formed in said housing and said rotary member.

8. The valve of claim 1 wherein said housing comprises a main body portion having said rotary member rotatably mounted therein and an outer portion secured and disposed transversely relative to said main body portion and having each of said inlet, outlet and seat defined therein.

9. The valve of claim 8 further comprising means defining an elongated slot through the outer portion of said housing and wherein the first end of said torsion spring means is disposed in said slot.

10. The valve of claim 1 wherein said valve member constitutes a ball.

11. The valve of claim 10 further comprising stop means secured to said housing and disposed in blocking relationship across said outlet on a downstream side of said ball for preventing said ball from rolling therepast.

12. The valve of claim 11 wherein said stop means is further disposed adjacent to the first end of said torsion spring means for limiting pivotal movement thereof.

13. The valve of claim 12 wherein said stop means constitutes a pin.

14. A method for assembling a valve comprising the steps of
placing a valve member in a housing adjacent to a seat defined therein between an inlet passage and outlet passage thereof,
mounting coils of a torsion spring, including first and second ends, on an exposed end of a rotary member rotatably mounted on said housing
anchoring the second end of said spring to the end of said rotary member,
engaging the first end of said spring with said valve member in non-attached relationship therewith to impose a predetermined closing force thereon, against said seat, and
securing a stop means to said housing adjacent to the first end of said torsion spring for limiting movement thereof.

15. The method of claim 14 further comprising the step of fixing the rotative position of said rotary member relative to said housing.

16. The method of claim 14 wherein said securing step comprises securing a pin to said housing to intersect said outlet passage for further preventing said valve member from moving therepast.

17. In a valve of the type comprising a housing having an inlet and an outlet defined therein, a seat defined in said housing between said inlet and said outlet, a ball loosely mounted in said housing and normally disposed on said seat for preventing fluid flow from said inlet to said outlet, torsion spring means having a first end thereof extending transversely relative to a longitudinal axis thereof and operatively engaging the periphery of said ball but otherwise unattached therewith for biasing the same against said seat under a predetermined closing force and for permitting unseating thereof from said seat to permit said inlet to communicate with said outlet when the force of said fluid in said inlet exceeds said predetermined closing force and stop means independent of said spring means secured to said housing and disposed in blocking relationship across said outlet on a downstream side of said ball for preventing said ball from moving therepast and for limiting movement of the first end of said spring means.

18. A method for assembling a valve comprising the steps of
placing a ball in rolling contact in a housing adjacent to a seat defined therein between an inlet passage and outlet passage thereof,
mounting a torsion spring, including first and second ends, on said housing,
anchoring the second end of said spring relative to said housing,
engaging the first end of said spring with said ball,
applying torsion to said spring to impart a predetermined closing force on said ball and against said seat,
separately retaining said spring in said torsional condition to set said closing force, and
securing a stop means to said housing adjacent to the first end of said torsion spring for limiting movement thereof.

19. In a valve of the type comprising a housing having an inlet and an outlet defined therein, a seat defined in said housing between said inlet and said outlet, and a velve member normally disposed on said seat for preventing fluid flow from said inlet to said outlet, the invention comprising torsion spring means having a first end thereof operatively engaging said valve member for biasing the same against said seat under a predetermined closing force and for permitting unseating thereof from said seat to permit said inlet to communicate with said outlet when the force of said fluid in said inlet exceeds said predetermined closing force, adjusting means connected to said torsion spring means and otherwise independent thereof for selectively varying the closing force of said torsion spring means against said valve member comprising a rotary member rotatably mounted in said housing and wherein said torsion spring means has a second end thereof anchored to said rotary member and holding means for selectively holding said rotary member in a selected rotated position relative to said housing comprising a set screw threadably mounted in said housing and normally engaging an outer surface of said rotary member to hold it in said selected rotational position.

* * * * *